United States Patent [19]

Yoshida

[11] Patent Number: 5,057,730

[45] Date of Patent: Oct. 15, 1991

[54] STRUCTURE FOR LOCATING PERMANENT MAGNETS IN DYNAMIC ELECTRIC MACHINE

[75] Inventor: Yasushi Yoshida, Kiryu, Japan

[73] Assignee: Mitsuba Electric Manufacturing Co., Ltd., Gunma, Japan

[21] Appl. No.: 526,591

[22] Filed: May 22, 1990

[51] Int. Cl.⁵ .............................................. H02K 5/00
[52] U.S. Cl. ....................................... 310/91; 310/42; 310/85; 310/89; 310/154; 310/157
[58] Field of Search .................... 310/154, 85, 88, 157, 310/91, 42, 89, 91, 258

[56] References Cited

U.S. PATENT DOCUMENTS

| | | | |
|---|---|---|---|
| 4,283,647 | 8/1981 | Herr et al. | 310/154 |
| 4,414,481 | 11/1983 | de Jong | 310/42 |
| 4,445,060 | 4/1984 | Ruhle et al. | 310/154 |
| 4,748,358 | 5/1988 | Ruhle et al. | 310/154 |
| 4,933,582 | 6/1990 | Hata et al. | 310/154 |

FOREIGN PATENT DOCUMENTS

| | | | |
|---|---|---|---|
| 0206166 | 2/1957 | Australia | 310/154 |
| 2-37550 | 3/1990 | Japan . | |
| 2-72645 | 6/1990 | Japan . | |

Primary Examiner—R. Skudy
Attorney, Agent, or Firm—Oliff & Berridge

[57] ABSTRACT

A dynamic electric machine has a yoke, permanent magnets to be fixed to the inner surface of the yoke and a guide plate disposed in the yoke and capable of guiding tie bolts which are extended axially through the yoke. A structure for locating the permanent magnets includes locating tabs formed on the guide plate and capable of contacting end surfaces of the permanent magnets so as to correctly locate the permanent magnets with respect to the yoke. The locating tabs may have integral adhesive-stopper portions capable of receiving adhesive flowing down along the inner surface of the yoke during bonding of the permanent magnets to the yoke, thereby preventing the adhesive from reaching a bottom portion of the yoke.

11 Claims, 3 Drawing Sheets

STRUCTURE FOR LOCATING PERMANENT MAGNETS IN DYNAMIC ELECTRIC MACHINE

BACKGROUND OF THE INVENTION

1. Field of the Invention

The present invention relates to a dynamic electric machine of the type having a guide plate which is disposed in a yoke and which guides tie bolts extending through the yoke in the axial direction. More particularly, the present invention is concerned with a structure for locating permanent magnets in this type of dynamic electric machine.

2. Description of the Related Art

In general, a dynamic electric machine of the type described requires that the permanent magnets to be mounted on the inner peripheral surface of a yoke have to be precisely located in order to attain a high degree of rotational precision of the machine. In order to precisely locate the permanent magnets, it has been a common measure to provide locating projections on the inner peripheral surface of the yoke. Each permanent magnet, when mounted, is placed such that its corner contacts the projection 10 so as to be precisely located on the yoke, as shown in FIG. 5A. In recent years, however, it has become popular to provide such permanent magnets 4 with corners which are rounded to avoid stress concentration, in order to prevent breakage or damage. When such a permanent magnet 4 having rounded corners is to be mounted in a yoke having a locating projection 10, the permanent magnet 4 tends to undesirably move onto the locating projection 10 as shown in FIG. 5B. This not only impedes the locating precision, but also causes a serious problem. Namely, when the machine is assembled while leaving the permanent magnet at a wrong position as shown in FIG. 5B, the permanent magnet 4 may dangerously interfere with the rotor during operation of the machine, thus impairing the quality of the product significantly.

The known magnet locating structure also suffers from a problem in that the yoke 2, which is formed by, for example, drawing, is undesirably deformed during a subsequent working for forming the locating projections 10. In addition, the outer surface of the yoke tends to become rusty due to accumulation of water in recesses 11 which are formed in the outer surface of the yoke as a result of the plastic work for forming the projections.

The permanent magnets located in the yoke are generally bonded to the yoke by means of, for example, an epoxy-type adhesive. The bonding is usually conducted while the yoke is held with its axis extending vertically. It has been often experienced that the adhesive, which has become less viscous due to heat, undesirably flows down to clog draining holes formed in the peripheral wall of the yoke or bolt holes provided in the bottom of the yoke, and even flows into the portion of the yoke in which a bearing is to be fitted.

SUMMARY OF THE INVENTION

Accordingly, an object of the present invention is to provide a structure for locating permanent magnets in a dynamic electric machine, thereby overcoming the above-described problems.

To this end, according to one aspect of the present invention, there is provided a structure for locating permanent magnets in a yoke of a dynamic electric machine of the type having a yoke, permanent magnets to be fixed to the inner surface of the yoke and a guide plate disposed in the yoke and capable of guiding tie bolts which are extended axially through the yoke, the structure comprising locating tabs formed on the guide plate and capable of contacting end surfaces of the permanent magnets so as to locate the permanent magnets.

According to another aspect of the invention, there is provided a structure for locating permanent magnets in a yoke of a dynamic electric machine of the type having a yoke, permanent magnets to be fixed to the inner surface of the yoke and a guide plate disposed in the yoke and capable of guiding tie bolts which are extended axially through the yoke, the structure comprising locating tabs formed on the guide plate and capable of contacting end surfaces of the permanent magnets so as to locate the permanent magnets, and adhesive-stopper portions provided on the locating tabs capable of receiving adhesive flowing down along the inner surface of the yoke during bonding of the permanent magnets to the yoke, thereby preventing the adhesive from reaching a bottom portion of the yoke.

According to yet another aspect of the present invention, the adhesive-stopper portions may be utilized independently of the locating tabs.

The structures set forth above can provide remarkable improvement in the locating precision for the permanent magnets, while eliminating problems such as clogging of through holes in the yoke with an adhesive which may flow down during fixing of the permanent magnets to the yoke.

The above and other objects, features and advantages of the present invention will become clear from the following description when the same is read in conjunction with the accompanying drawings.

DESCRIPTION OF THE PREFERRED EMBODIMENTS

Figure 1:
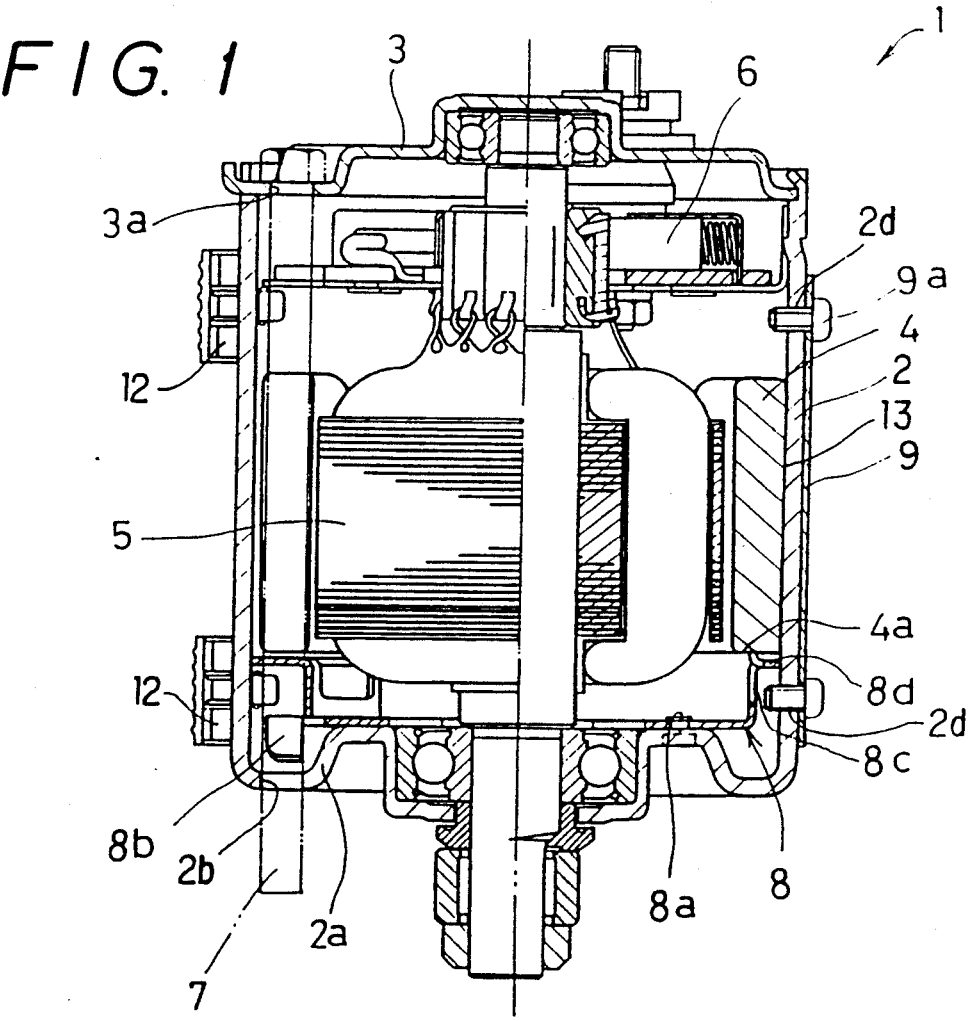
FIG. 1 is a vertical sectional view of a motor as an example of a dynamic electric machine to which the present invention is applied.
Figure 2:
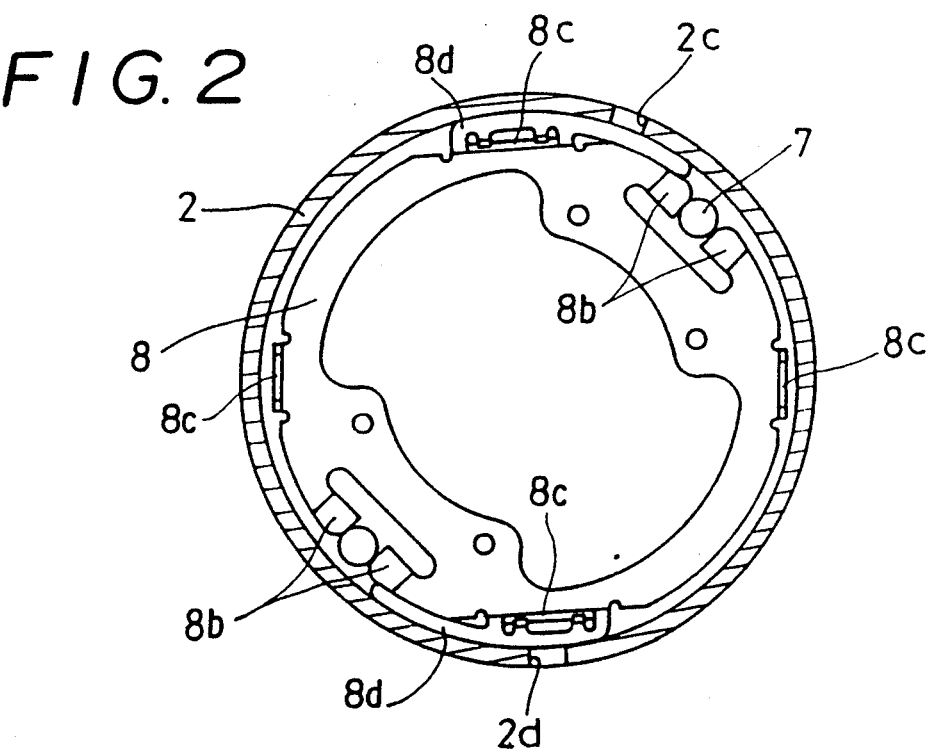
FIG. 2 is a sectional view of the motor shown in FIG. 1.
Figure 3:
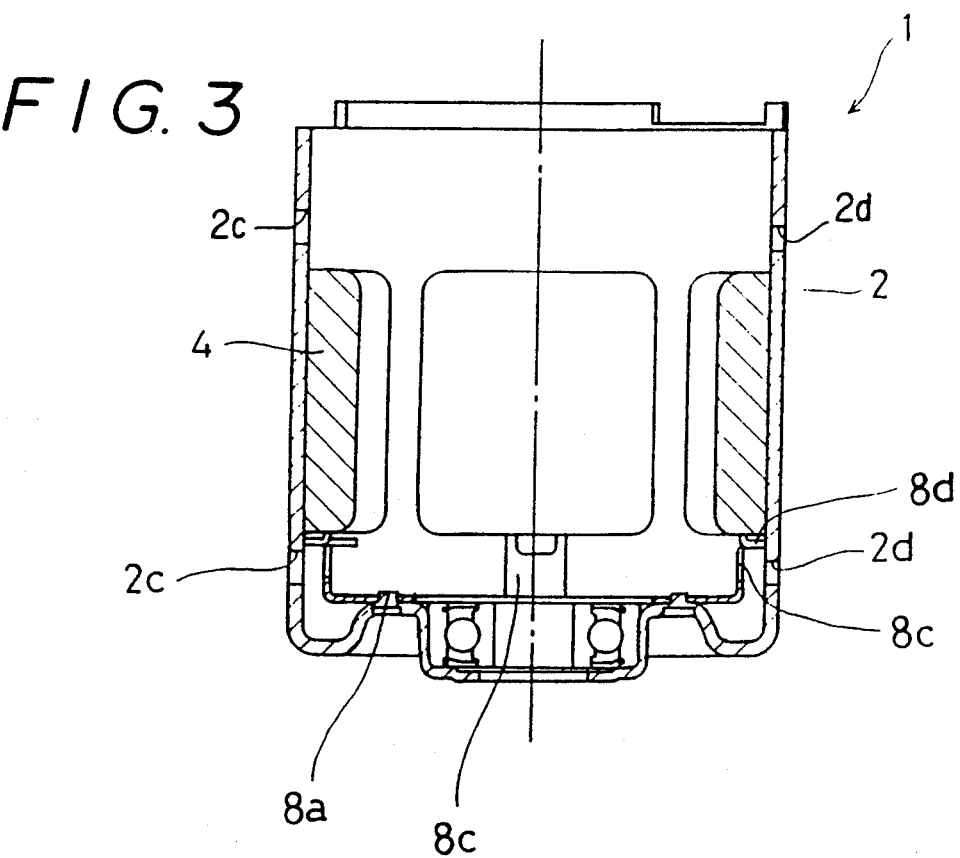
FIG. 3 is a sectional side elevational view of a yoke of the motor after removal of a rotor.
Figure 4A:
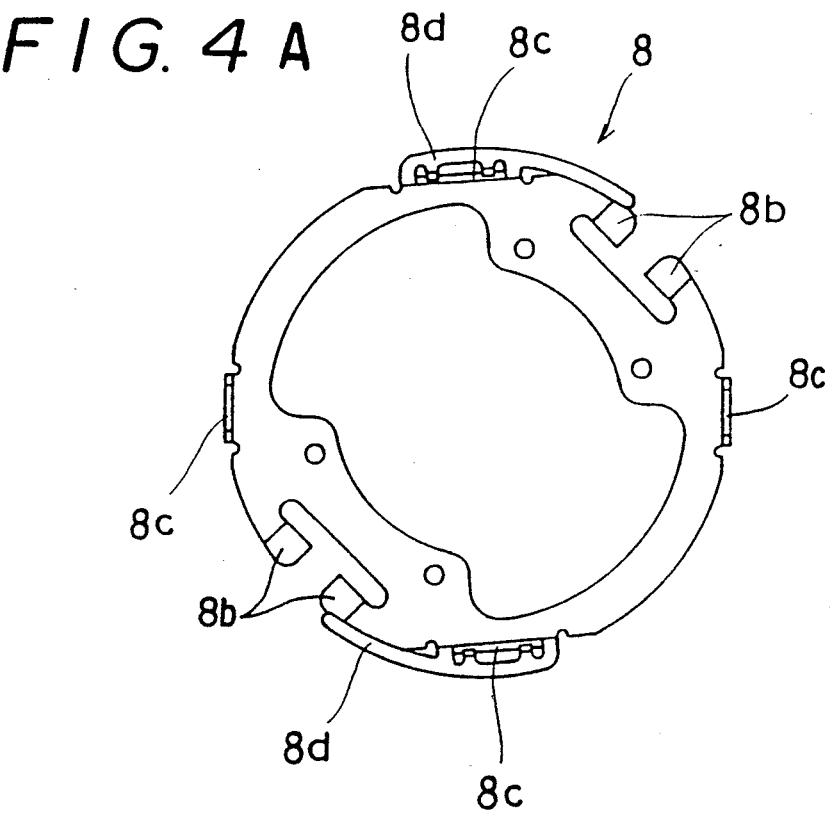
FIGS. 4A, 4B, 4C and 4D are a top plan view, a front elevational view, a side elevational view and a bottom plan view of a guide plate.
Figure 4B:
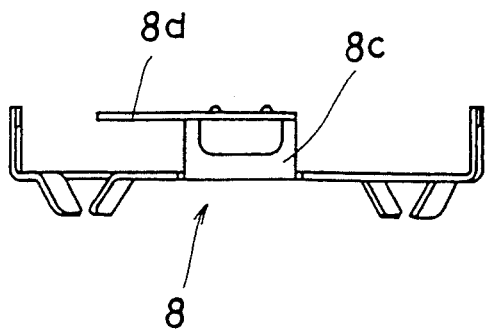
Figure 4D:
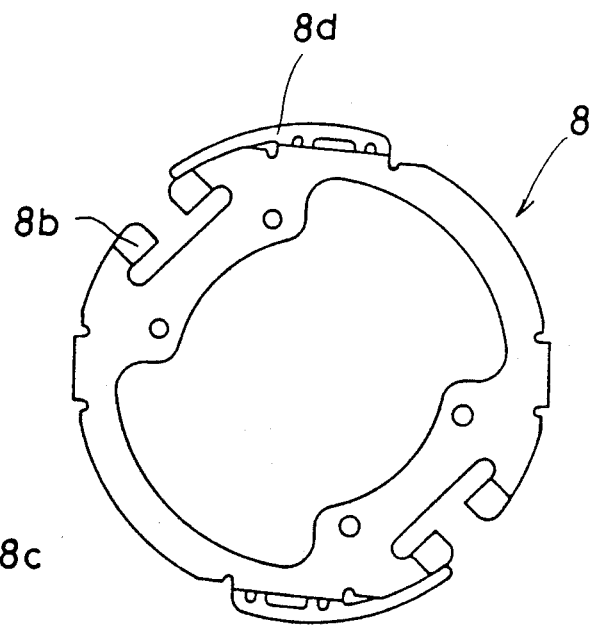
Figure 4C:
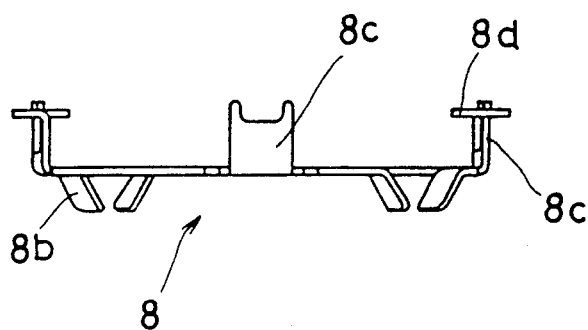
Figure 5A:
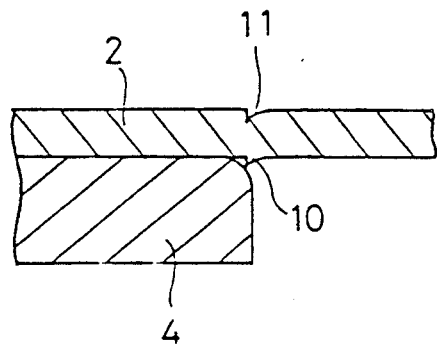
FIGS. 5A and 5B are sectional views of a critical portion of a known structure.
Figure 5B:
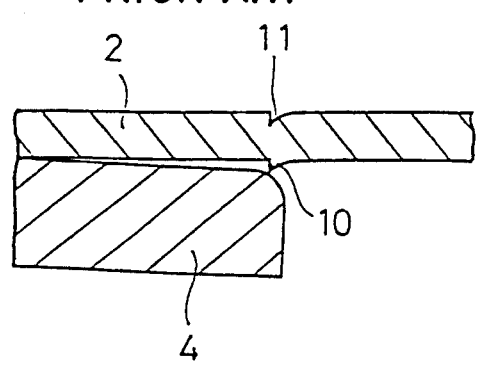

Preferred embodiments of the present invention will be described with reference to FIGS. 1–4D of the drawings.

An electric motor 1 has an outer shell which is composed mainly of a yoke 2 formed by, for example, drawing in a substantially cylindrical form with a bottom 2a, and an end bracket 3 which closes the open end of the yoke 2. The motor 1 also has permanent magnets 4 further discussed below, rotor 5, brushes 6 and so forth.

A numeral 7 designates tie bolts which are inserted into holes 3a formed in the end bracket 3 so as to extend through holes 2b formed in the bottom 2a of the yoke 2. The ends of the tie bolts 7 projecting beyond the holes 2b are fastened to a stationary member, whereby the motor 1 is fixed to the stationary member. In addition, draining holes 2c and threaded holes 2d for bracket-mounting screws 9a are provided in the peripheral wall of the yoke 2. The motor 1 is adapted to be mounted horizontally, such that the draining holes 2c are directed downward, by means of a bracket 9 which is fixed to the yoke 2 by means of the screws 9a. Numeral 12 denotes drain covers provided so as to cover the draining holes 2c.

A guide plate 8 is fixed to the inner surface of the bottom 2a of the yoke 2 by caulking as at 8a. The guide plate 8 is provided with guide tabs 8b formed by bending and capable of guiding the ends of the tie bolts 7 towards the holes 2b when these bolts are inserted from the end adjacent the end bracket 3. More specifically, a pair of guide tabs 8b are to be associated with each tie bolt 7. These guide tabs 8b converge towards one another towards the bottom 2a so that their tapered surfaces serve as guide surfaces for correctly and smoothly guiding the end of each tie bolt 7 into the hole 2b which is aligned with the gap between the opposing ends of the pair of guide tabs 8b. The guide plate 8 also has a plurality of locating tabs 8c provided on the peripheral edge portion thereof. In the illustrated embodiment, there are four locating tabs 8c. The locating tabs 8c project towards the end bracket 3 such that their ends abut substantially mid portions of end surfaces 4a of the permanent magnets 4. Therefore, when the permanent magnets 4 are bonded with adhesive 13 to the inner peripheral surface of the yoke 2, the end surfaces 4a of the magnets 4 are stopped by the locating tabs 8c so that the permanent magnets 4 are properly located.

Two locating tabs 8c face the lowermost draining hole 2c and the lowermost threaded hole 2d, respectively. These two locating tabs 8c are provided with adhesive-stopper portions 8d having an arcuate form so as to extend substantially along the inner peripheral surface of the yoke 2. During bonding of the permanent magnets 4 to the inner peripheral surface of the yoke 2, any portion of the adhesive flowing down along the inner peripheral surface of the yoke 2 is received by the adhesive-stopper portions so as to be prevented from flowing into the lowermost draining hole 2c and threaded hole 2d.

It will be appreciated that locating tabs 8c may be utilized without adhesive-stopper portions 8d. It will be further appreciated that adhesive-stopper portions 8d may be utilized independently of locating tabs 8c, such as, for example, in conjunction with conventional locating projections on the inner surface of the yoke.

Thus, in the embodiment having the described construction, the permanent magnets 4 to be fixed to the inner peripheral surface of the yoke 2 are correctly located by locating tabs 8c which are integrally formed on the guide plate 8 used for guiding the tie bolts 7. Namely, the locating tabs 8c contact substantially the mid portions of the end surfaces 4a of the permanent magnets 4 so as to locate these permanent magnets. In the known structure in which the permanent magnets are located by a projection formed on the inner peripheral surface of the yoke, problems are encountered such as wrong positioning of the permanent magnets due to undesirable movement of the magnets 4 onto the locating projections. In the described embodiment, however, this problem is overcome and the permanent magnets 4 can be correctly located in the yoke 2. Furthermore, since the locating tabs 8c are portions of the guide plate 8 which is a member separate from the yoke 2, the undesirable deformation of the yoke 2, which is often caused during plastic working for forming the locating projections in the known structure, can be avoided. Consequently, troubles such as cracking or separation of the permanent magnets, which tend to be caused by stresses generated when the adhesive resin is cured and hardened on a formed yoke, are avoided without fail. Furthermore, rusting of the outer surface of the yoke due to accumulation of water in the recesses formed during plastic working for forming the locating projections in the known structure is also avoided.

Thus, the described embodiment offers remarkable improvement in the locating precision of the permanent magnets 4, dimensional precision of the yoke 2 and rust prevention, thus enabling production of a motor 1 having high performance and quality.

The locating tabs 8c are formed by bending predetermined portions of the guide plate 8 which is used for the purpose of providing a guide for tie bolts 7. Thus, the locating means can easily be realized without requiring any additional or separate part, and the construction is simplified as compared with the known device which relies upon the locating projections formed on the yoke 2.

Furthermore, the described embodiment brings about an additional advantage in that the locating structure of the embodiment can adapt to a wide variety of sizes, i.e., axial lengths of the permanent magnets, simply by changing the height of projection of the locating tabs 8c.

In the assembly of the motor, the permanent magnets 4 are fixed to the inner surface of the yoke 2, by fitting the guide plate 8 in the yoke 2, setting the yoke 2 such that its axis extends vertically, fitting the permanent magnets 4 with an adhesive applied thereto into the yoke 2, keeping the permanent magnets 4 in pressure contact with the inner surface of the yoke 2 by suitable jigs (not shown), heating the adhesive to allow it to melt and then cooling to allow the adhesive to solidify. During the heating, the adhesive which has become fluid tends to flow down along the inner surface of the yoke 2. The adhesive-stopper portions 8d on the locating tabs 8c, however, receive such portion of the adhesive flowing down along the inner surface of the yoke 2 so as to prevent the same from reaching the bottom 2a of the yoke 2, thereby preventing clogging of the draining hole 2c, threaded hole 2d and the through holes 2b. The adhesive-stopper portions 8d are integral parts of the guide plate 8 which also serves as the member for locating the permanent magnets. Thus, the adhesive-stopper portions 8d for receiving adhesive flowing down along the inner surface of the yoke can be provided without requiring any additional separate part and without substantially complicating the assembly process. The adhesive received by the adhesive-stopper portions 8d, when hardened, serves to integrate the permanent magnets and the guide plate 8, thus preventing undesirable vibration or play of the guide plate 8 in the motor.

In summary, the present invention offers the following advantages. The permanent magnets 4, when bonded to the inner surface of the yoke 2, are stably and correctly located by the locating tabs which are formed on the guide plate for guiding tie bolts. Therefore, the problem of wrong positioning of the permanent magnets, which is often experienced in the known arrangement relying upon locating projections formed on the yoke, can be avoided, thus ensuring a very high positional precision of the permanent magnets. In addition, problems such as deformation of the yoke and promotion of rust generation, which are attributable to the work for forming the locating projections in the known device, can be completely eliminated. Thus, the present invention produces remarkable improvements in the positional precision of the permanent magnets in the yoke, dimensional precision of the yoke and rust prevention of the yoke, thus making it possible to produce dynamic electric machines of high performance and quality. These remarkable effects are obtained without requiring any increase in the number of parts and without troublesome work, since the locating tabs are integral parts of the guide plate which is inherently used in the motor as means for guiding tie bolts.

Furthermore, flowing of adhesive in liquid state onto the bottom of the yoke can be prevented by a simple structure employing adhesive-stopper portions formed on the guide plate, so that undesirable blocking of the draining port and threaded hole in the bottom of the yoke, as well as solidification of the adhesive in the bearing-receiving portion of the yoke, can be avoided without fail. This remarkable effect is attained without requiring any additional separate part and without being accompanied by troublesome assembly procedure, thus enabling high precision in the assembly.

What is claimed is:

1. A dynamic electric machine comprising:
   a yoke with a bottom surface having at least one tie bolt hole;
   at least one tie bolt extending through said yoke and into said tie bolt hole;
   at least one permanent magnet held against an inner surface of said yoke;
   a guide plate disposed within said yoke and including at least one guide tab, inclined toward said bottom surface of the yoke, for guiding said tie bolt into said tie bolt hole; and
   means on said guide plate for locating said permanent magnet on said yoke.

2. The dynamic electric machine of claim 1, wherein said locating means comprises at least one locating tab formed on said guide plate.

3. The dynamic electric machine of claim 2, wherein said locating tab is arranged to contact an end surface of said permanent magnet so as to locate said permanent magnet.

4. The dynamic electric machine of claim 1, wherein said magnet is bonded to said inner surface of said yoke with adhesive, and said machine further comprises means for preventing adhesive from flowing to a bottom portion of said yoke during bonding of said magnet to said yoke.

5. The dynamic electric machine of claim 4, wherein said preventing means is disposed on said guide plate.

6. The dynamic electric machine of claim 2, wherein said magnet is bonded to said inner surface of said yoke with adhesive, and said guide plate further comprises at least one adhesive-stopper portion provided on said locating tab and arranged to receive adhesive flowing down along the inner surface of said yoke during bonding of said magnet to said yoke.

7. The dynamic electric machine of claim 1, wherein said guide plate includes at least two guide tabs converging toward one another in the direction of said bottom surface of the yoke.

8. A dynamic electric machine comprising:
   a yoke with a bottom surface having a plurality of tie bolt holes;
   a plurality of tie bolts extending through said yoke and into said tie bolt holes;
   a plurality of permanent magnets held against an inner surface of said yoke;
   a guide plate disposed within said yoke and including at least two guide tabs, converging toward one another in the direction of said bottom surface of the yoke, for guiding said tie bolts into said tie bolt holes; and
   a plurality of locating tabs formed on said guide plate and arranged to contact end surfaces of said permanent magnets so as to locate said permanent magnets.

9. The dynamic electric machine of claim 8 wherein said magnets are bonded to said inner surface of said yoke with adhesive, and said guide plate further comprises an adhesive-stopper portion provided on at least one of said locating tabs and arranged to receive adhesive flowing down along the inner surface of said yoke during bonding of said magnets to said yoke.

10. The dynamic electric machine of claim 9, comprising an adhesive-stopper portion on each of said locating tabs.

11. A dynamic electric machine comprising:
    a yoke;
    at least one permanent magnet bonded to an inner surface of said yoke with adhesive;
    a guide plate disposed within said yoke; and
    at least one arcuate adhesive-stopper portion extending from said guide plate substantially along said inner surface of said yoke so as to receive adhesive flowing down along the inner surface of said yoke during bonding of said magnet to said yolk.

* * * * *